(12) United States Patent
Powell et al.

(10) Patent No.: US 8,167,328 B2
(45) Date of Patent: May 1, 2012

(54) TRAVEL ADJUSTMENT MECHANISM FOR A SUSPENSION SYSTEM

(75) Inventors: Robert Powell, Colorodo Springs, CO (US); James Osbourne, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 128 days.

(21) Appl. No.: 12/883,939

(22) Filed: Sep. 16, 2010

(65) Prior Publication Data
US 2012/0068436 A1    Mar. 22, 2012

(51) Int. Cl.
*B62K 21/02*      (2006.01)
(52) U.S. Cl. ........................................ 280/283; 280/279
(58) Field of Classification Search .................. 280/276, 280/279, 283; 267/217, 221; 188/282.1, 188/281, 285, 297, 317
See application file for complete search history.

(56) References Cited

U.S. PATENT DOCUMENTS

| | | | | |
|---|---|---|---|---|
| 6,095,541 A * | 8/2000 | Turner et al. | ................... | 280/276 |
| 6,105,988 A * | 8/2000 | Turner et al. | ................... | 280/276 |
| 6,260,832 B1 * | 7/2001 | Vignocchi et al. | ......... | 267/64.15 |
| 6,343,807 B1 * | 2/2002 | Rathbun | ........................ | 280/276 |
| 6,471,197 B1 | 10/2002 | Denk et al. | | |
| 7,137,638 B2 * | 11/2006 | Turner | ........................ | 280/276 |
| 7,163,223 B2 | 1/2007 | Wesling et al. | | |
| 7,722,069 B2 * | 5/2010 | Shirai | ............................ | 280/276 |
| 7,891,645 B2 * | 2/2011 | Schroeder | ...................... | 267/178 |
| 2011/0084464 A1 * | 4/2011 | Inoue et al. | ................... | 280/276 |

* cited by examiner

*Primary Examiner* — Tashiana Adams
(74) *Attorney, Agent, or Firm* — Milan Milosevic; Lisa Serdynski; Steven Courtright

(57) ABSTRACT

A suspension system for a handlebar-steered vehicle includes an upper tube, a lower tube reciprocally slidable relative to the upper tube. A positive spring assembly biases the upper and lower tubes away from each other. A piston assembly is attached to the lower tube. The suspension includes a travel adjustment mechanism including a locking mechanism and an actuator. The locking mechanism is connected to the positive spring assembly and selectively maintains a first portion of the positive spring assembly in a compressed state with the upper and lower tubes drawn toward each other. The actuator is operatively connected to the locking mechanism to releasably engage the locking mechanism to maintain the first portion of the positive spring assembly in the compressed state.

22 Claims, 17 Drawing Sheets

TRAVEL ADJUSTMENT MECHANISM FOR A SUSPENSION SYSTEM

BACKGROUND OF THE INVENTION

The present invention relates to suspension systems and more particularly to a suspension system including a travel adjustment mechanism for adjusting the travel and/or length of the suspension system by selectively maintaining a portion of a positive spring assembly in a compressed state.

SUMMARY OF THE INVENTION

The present invention provides a suspension system for a handlebar-steered vehicle that includes a travel adjustment mechanism. The suspension system generally includes an upper tube and a lower tube reciprocally slidable relative to each other. A positive spring assembly biases the upper and lower tubes away from each other. A piston assembly is attached to the lower tube and deflects the positive spring assembly under loading. The travel adjustment mechanism includes a locking mechanism and an actuator. The locking mechanism is connected to the positive spring assembly and selectively maintains a first portion of the positive spring assembly in a compressed state with the upper and lower tubes drawn toward each other. The actuator is operatively connected to the locking mechanism to releasably engage the locking mechanism to maintain the first portion of the positive spring assembly in the compressed state.

In one embodiment of the present invention, the positive spring assembly includes first and second positive springs in series. The locking mechanism selectively maintains the first positive spring in the compressed state. The second positive spring is attached to the piston assembly. The locking mechanism includes a displaceable sleeve engaged with and displacing the first and second positive springs to position the displaceable sleeve into a locked position. The locking mechanism further includes a connector attached to the upper tube and a locking element. The displaceable sleeve is displaceable relative to the connector. The locking element releasably locks the displaceable sleeve and the connector to each other to maintain the first positive spring in the compressed state. The locking element is radially biased by the actuator to engage a groove in either the connector or the displaceable sleeve to lock the connector and the displaceable sleeve to each other with the upper and lower tubes drawn toward each other. The actuator includes a magnet radially biasing the locking element to disengage the groove in either the connector or the displaceable sleeve to unlock the connector and the displaceable sleeve from each other with the upper and lower tubes drawn away from each other.

The suspension system may further include a negative spring biasing the upper and lower tubes toward each other. In alternative embodiments of the present invention, the first and second positive springs may be any combination of coil and gas springs or the like. Further, the positive spring assembly may include only a single positive coil spring wherein a portion of the single coil spring is selectively maintained in a compressed state with the upper and lower tubes drawn toward each other.

The travel adjustment mechanism may selectively adjust the suspension system between at least a first travel setting and a second travel setting. In the first travel setting, the positive spring assembly has a first preload. In the second travel setting, the first portion of the positive spring assembly maintained in the compressed state has a second preload without increasing the preload in a second portion of the positive spring assembly.

These and other features and advantages of the present invention will be more fully understood from the following description of one or more embodiments of the invention, taken together with the accompanying drawings.

DETAILED DESCRIPTION

Figure 1:
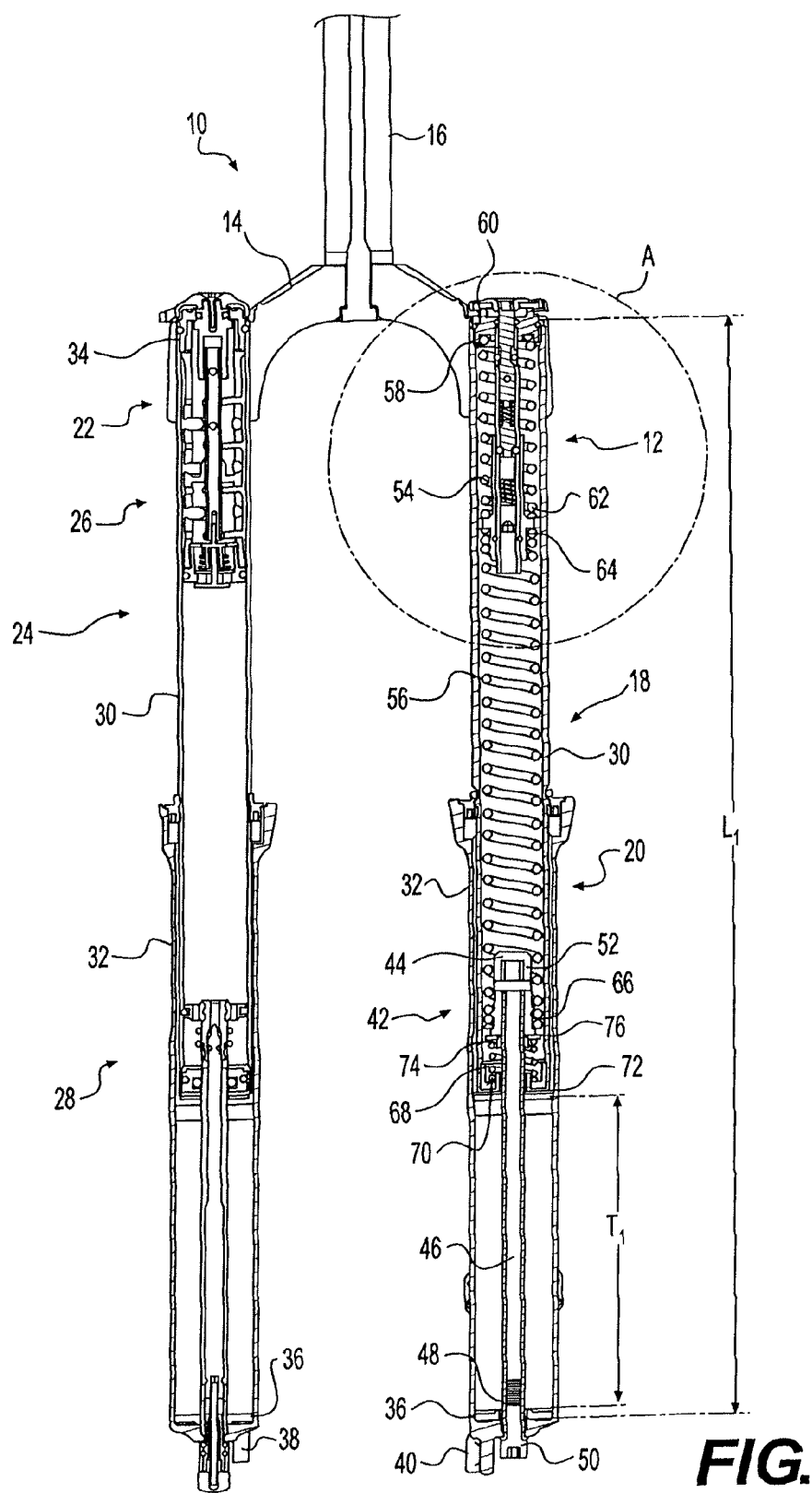
FIG. 1 is a front cross-sectional view of a suspension system in a long travel setting according to one embodiment of the present invention.

FIGS. 1-6 illustrate a suspension system 10 including a travel adjustment mechanism 12 according to one embodiment of the present invention. The suspension system 10 depicted is a bicycle front suspension fork having a crown 14 that is connected to a steerer tube 16, a first leg 18 that contains a biasing mechanism or a positive spring assembly 20 and a second leg 22 that contains a damping mechanism 24. The damping mechanism 24 includes an oil compression damping system 26 and an oil rebound damping system 28. Each of the legs 18, 22 includes an upper tube 30 and a lower tube 32. Although the upper tubes 30 are shown as inner tubes slidable within the lower outer tubes 32, it will be appreciated that the lower tubes 32 may alternatively be reconfigured as inner tubes slidable within reconfigured outer tubes. Additionally, although the tubes 30, 32 are shown to have substantially circular cross sections, it is understood that they may assume any cross-sectional shape. The inner and outer tubes 30, 32 are connected at their remote ends 34, 36 to the crown and a wheel axle (not shown) through dropouts 38, 40, respectively. It is to be understood that although the present invention is described with respect to a front suspension fork, the suspension system 10 may also be embodied as other suspension components disposed at other locations on a bicycle frame. Further, the suspension system 10 of the present invention may be used on motorcycles as well as other handlebar-steered vehicles.

The suspension system 10 includes a piston assembly 42 having a piston 44 and a rod 46. One end 48 of the rod 46 is attached to the end 36 of the lower tube 32 by a screw 50. The other end 52 of the rod 46 extends into the upper tube 30 and is attached to the piston 44. The positive spring assembly 20 includes first and second positive springs 54, 56 in series, in this embodiment, coil springs functioning as one spring. The spring rate $K_t$ for the combined positive springs 54, 56 is determined by $1/K_t = 1/K_1 + 1/K_2$, where $K_1$ is the rate of the first positive spring 54 and $K_2$ is the rate of the second positive spring 56. The first and second positive springs 54, 56 bias the upper and lower tubes 30, 32 apart or away from each other. One end 58 of the first positive spring 54 is attached is a top cap 60 disposed at the end 34 of the upper tube 30. The other end 62 of the first positive spring 54 is engaged with the travel adjustment mechanism 12. The second positive spring 56 is attached to the travel adjustment mechanism 12 at one end 64 and is attached to the piston 44 at the other end 66. The suspension system 10 also includes a negative or top-out spring 68 biasing the upper and lower tubes 30, 32 toward each other. One end 70 of the top-out spring 68 is attached to an end 72 of the upper tube 30 and the other end 74 of the top-out spring 68 is attached to a top-out stop element 76 limiting the expansion of the upper and lower tubes 30, 32 when a long travel setting is selected. When a short travel setting is selected, the top-out stop element 76 no longer contacts the piston 44. The piston rod 52 extends through the top-out spring 68.

Figure 2:
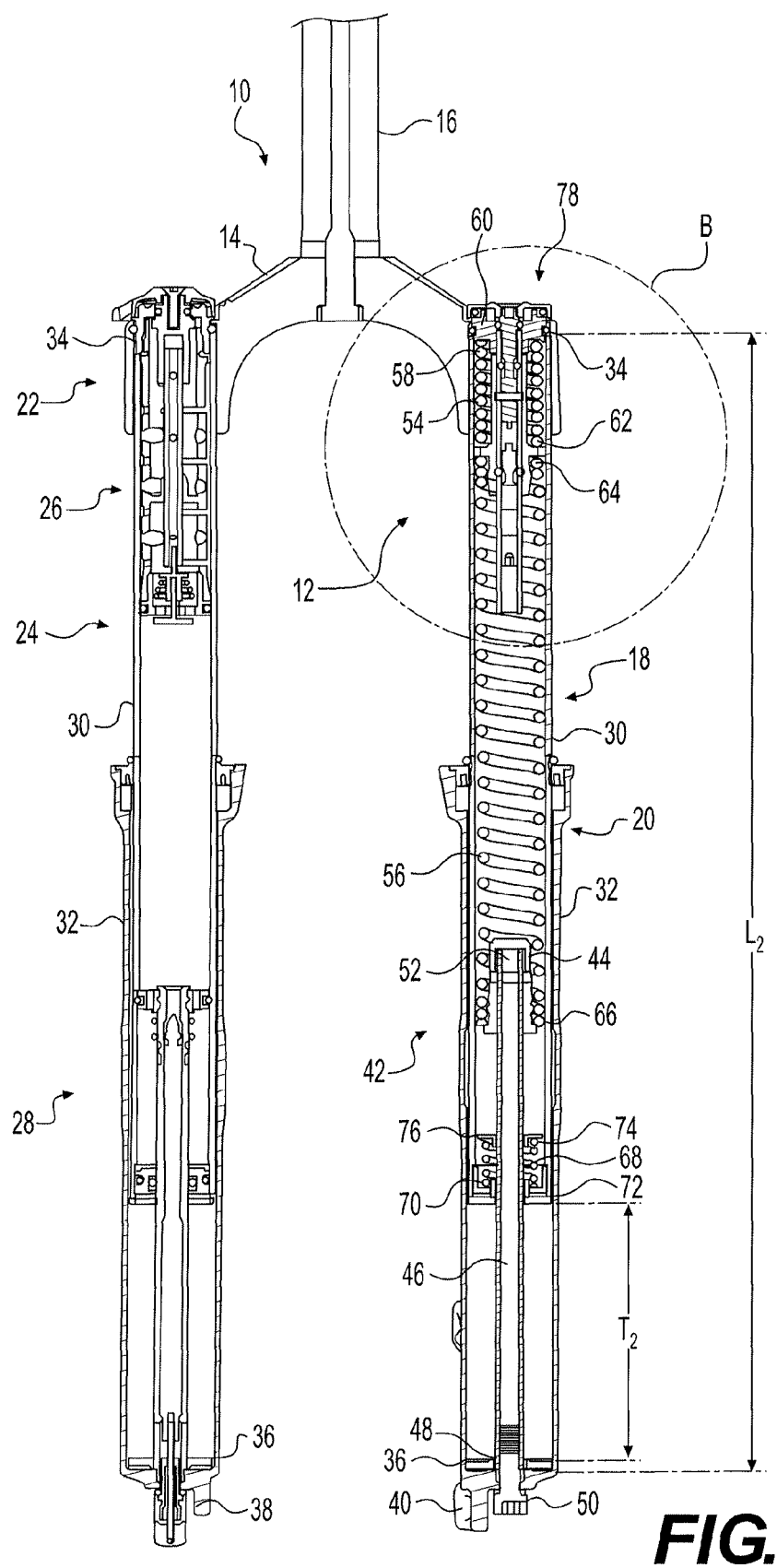
FIG. 2 is a front cross-sectional view of the suspension system of FIG. 1 in a short travel setting.
Figure 3:
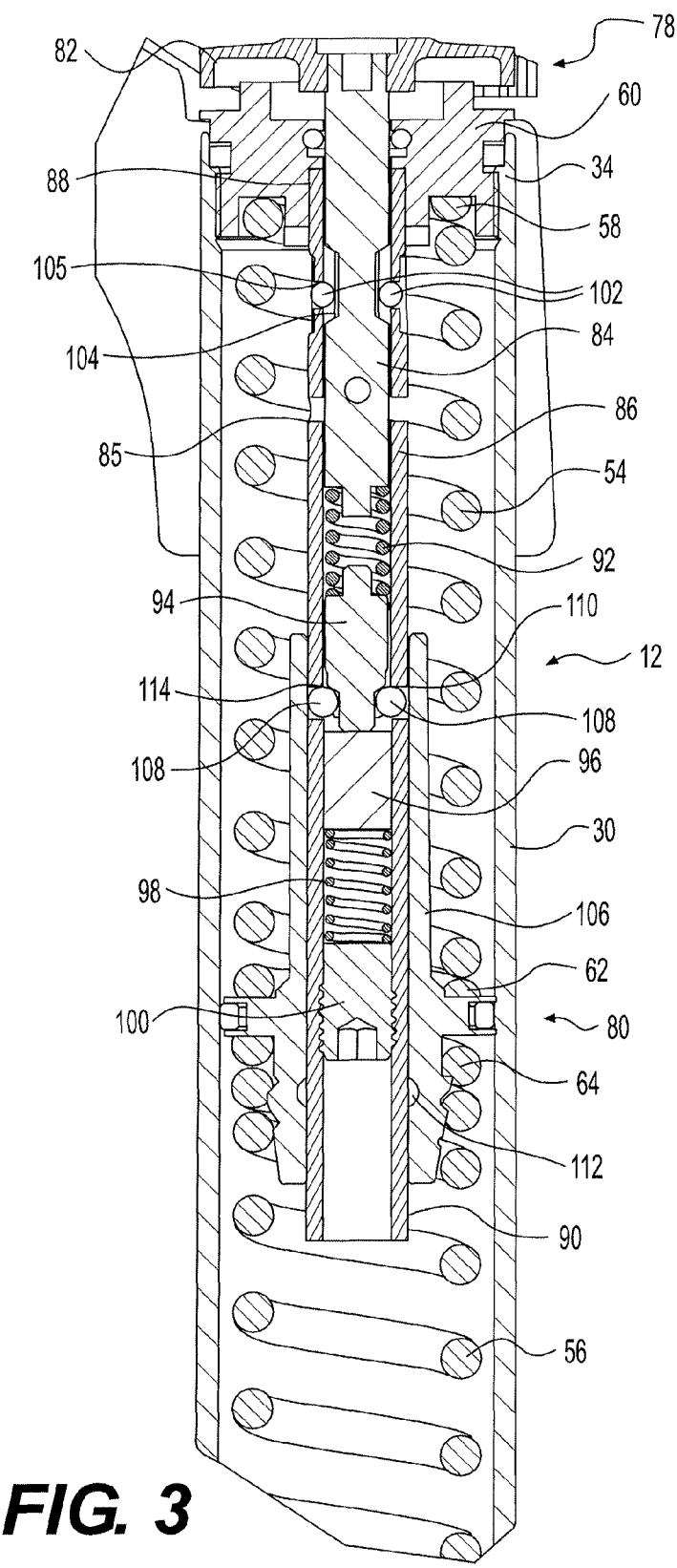
FIG. 3 is an enlarged front cross-sectional view of detail A of FIG. 1 showing a travel adjustment mechanism in the long travel setting.
Figure 4:
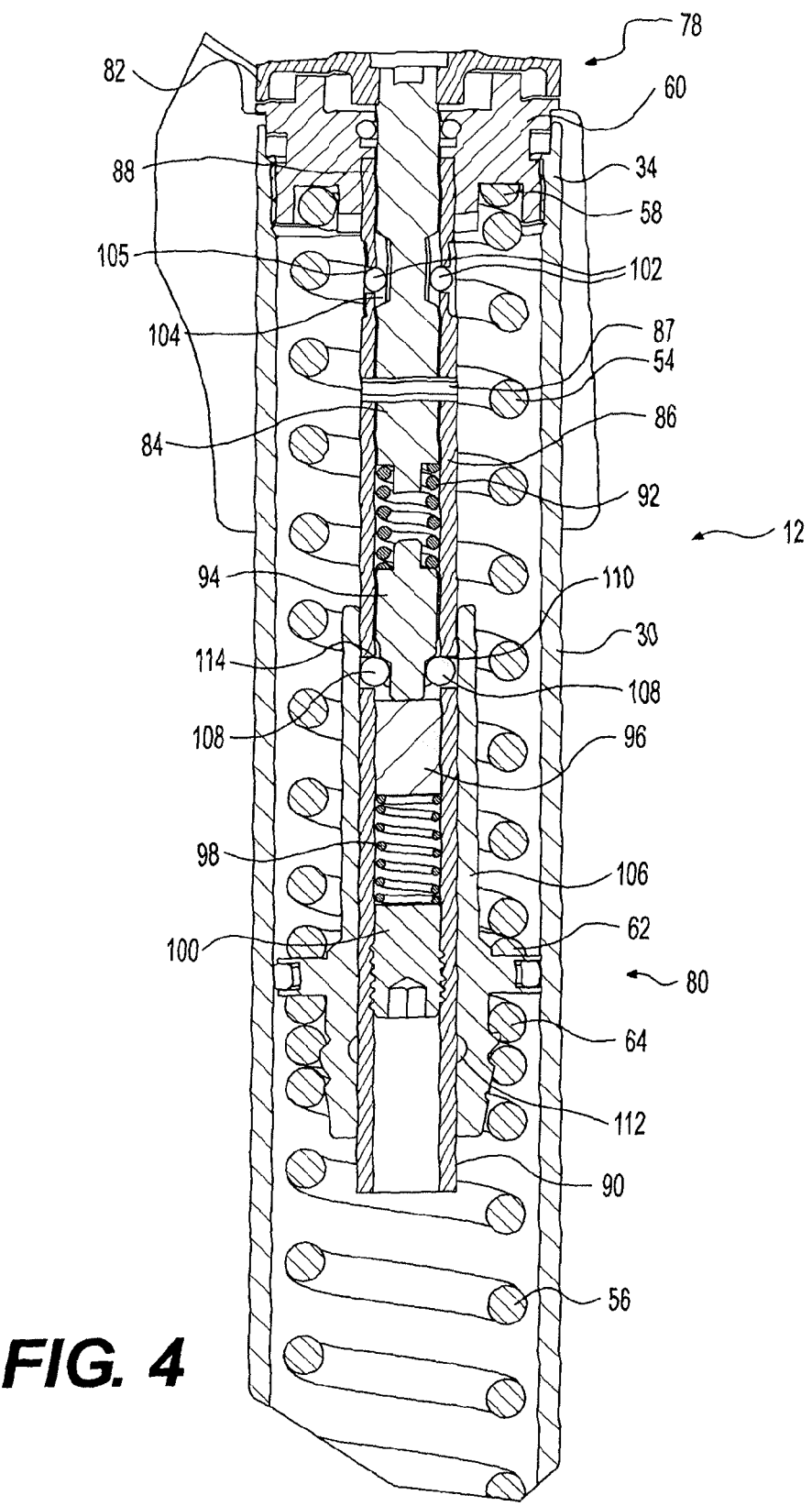
FIG. 4 is a front cross-sectional view of the travel adjustment mechanism of FIG. 3 during an adjustment of the travel setting from the long travel setting to the short travel setting.
Figure 5:
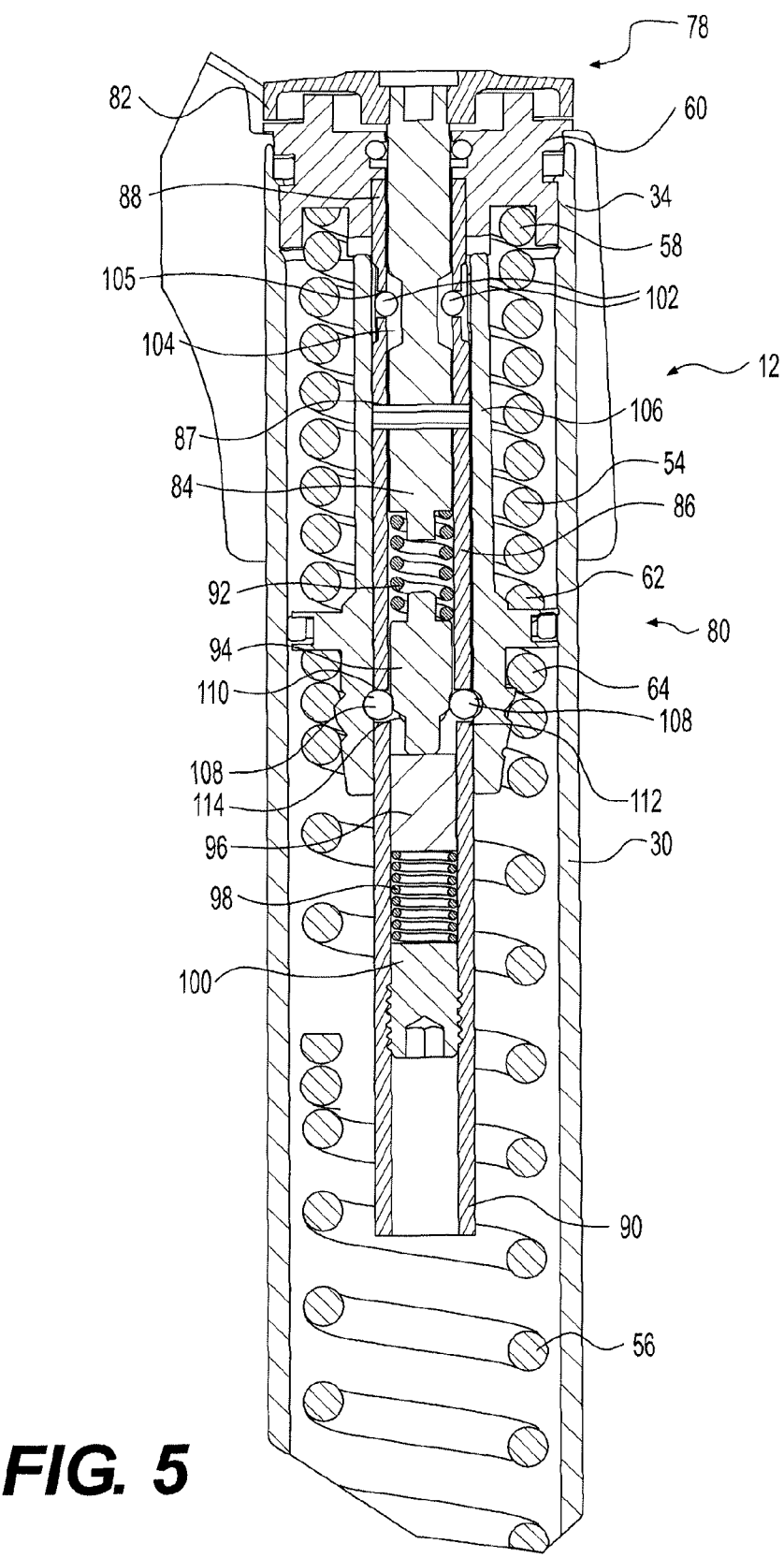
FIG. 5 is an enlarged front cross-sectional view of detail B of FIG. 2 showing the travel adjustment mechanism in the short travel setting.
Figure 6:
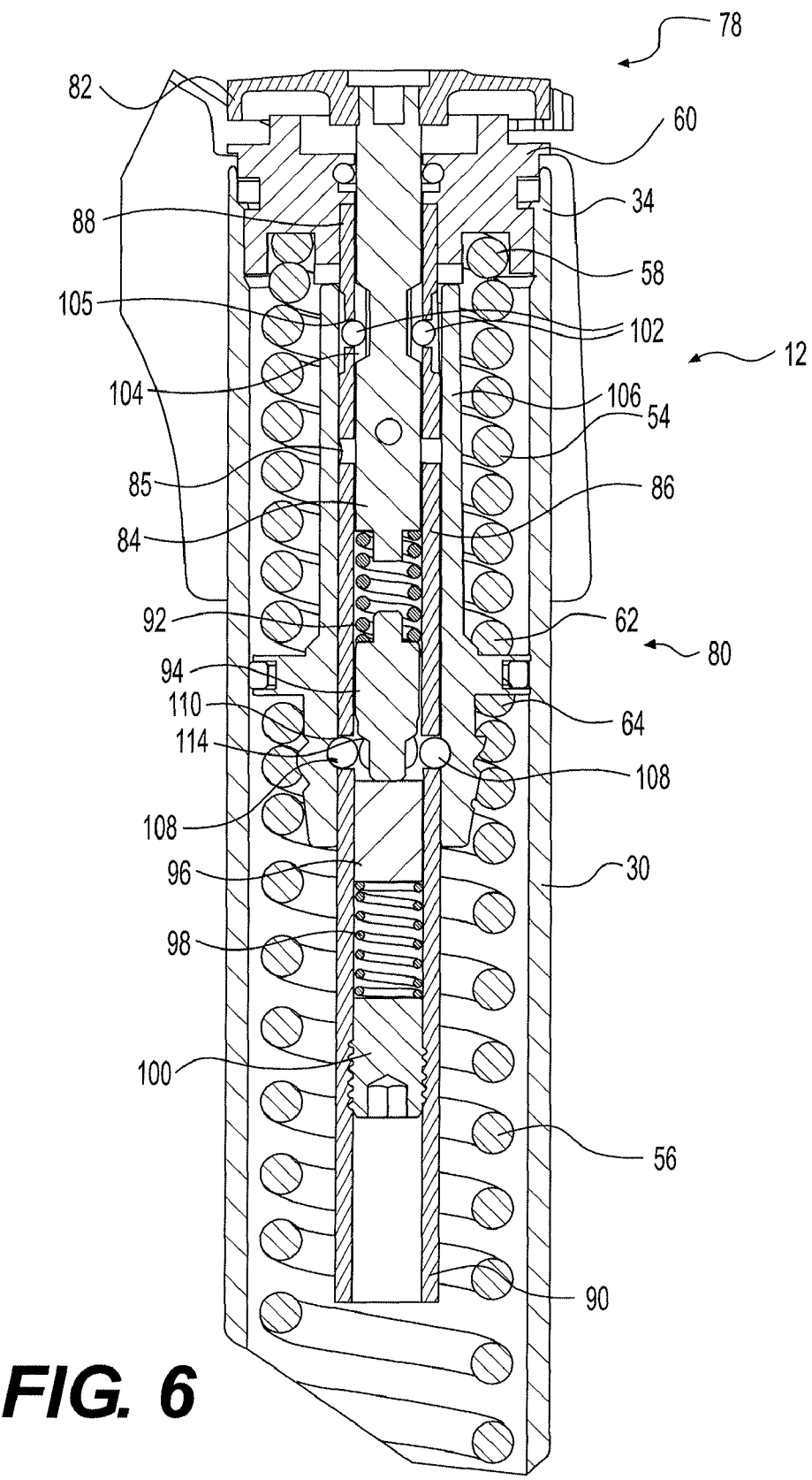
FIG. 6 is a front cross-sectional view of the travel adjustment mechanism of FIG. 5 during an adjustment of the travel setting from the short travel setting to the long travel setting.

The travel adjustment mechanism 12 adjusts the travel and/or length of the suspension system 10. Travel of the suspension system 10 refers to a maximum amount the upper and lower tubes may slidably displace relative to each other. The length of the suspension system 10 is measured between an end of the upper tube and an end of the lower tube. The suspension system 10 has at least two travel settings, long and short travel settings. FIG. 1 shows the suspension system 10 in a long travel setting having a length $L_1$ and a travel $T_1$ and FIG. 2 shows the suspension system 10 in a short travel setting having a shorter length $L_2$ and a shorter travel $T_2$. Looking to FIGS. 3-6, the travel adjustment mechanism 12 includes an actuator 78 and a locking mechanism 80. The actuator 78 includes an external knob 82 connected to a shaft 84 extending through a connector, in this embodiment a tube 86, and the top cap 60 attached to the end 34 of the upper tube 30. One end 88 of the tube 86 is attached to the top cap 60 and the other end 90 of the tube 86 extends through the first and second positive springs 54, 56. The tube 86 includes a helical slot 85 for receiving a pin 87 fixed to the shaft 84. The shaft 84 is connected to a spring 92 which is attached to a poker 94. The poker 94 is stacked on a magnet 96 which is stacked on a return spring 98 stacked on a set screw 100 that preloads the return spring 98. The actuator 78 also includes detent balls 102 received in slots 104, 105 in the shaft 84 and tube 86, respectively, to signal the rider when the next travel setting has been selected and allows the shaft 84 to axially displace within the tube 86. The locking mechanism 80 includes a displaceable sleeve 106 and a locking element, in this embodiment, metal balls 108. The metal balls 108 are received in holes 110 in the tube 86. The sleeve 106 is engaged with the end 62 of the first positive spring 54 and is connected to the end 64 of the second positive spring 56. The tube 86 extends through the sleeve 106. The sleeve 106 includes a groove 112 to receive the metal balls 108 to lock the tube 86 and sleeve 106 together.

Looking to FIGS. 3-6, to adjust the travel from a long travel setting to a short travel setting, the rider rotates the knob 82 to the short travel setting. As the shaft 84 is rotated, the pin 87 displaces in the helical slot 85 which drives the shaft 84 to preload or compress the spring 92 which in turn applies a force against the poker 94 (see FIG. 4). The force against the poker 94 causes the poker 94 to press against the metal balls 108. The shaft 84 is prevented from returning to the long travel setting because the slot 85 is configured such that the last few degrees of rotation are flat with no pitch which causes the force generated by the spring 92 to be perpendicular to the slot 85, thus preventing the spring 92 from being able to return the shaft 84 to the long travel setting. Next, the rider pushes down, compressing the entire fork, causing the sleeve 106 to displace toward the top cap 60 and compress the first positive spring 54 until the metal balls 108 align with the groove 112 in the sleeve 106. Once the metal balls 108 are aligned with the groove 112, the spring 92 downwardly displaces the poker, which in turn, displaces the metal balls 108 radially outward into the groove 112, locking the sleeve 106 and tube 86 together. A chamfer 114 on the poker 94 biases the metal balls 108 radially outwardly. The first positive spring 54 is now locked in a compressed state and has a higher preload than when in the long travel setting (see FIG. 5). The length of the entire suspension fork is generally shortened by the length that the first positive spring 54 has been compressed when the sleeve 106 and the tube 86 are locked together. The preload of the second positive spring 56 does not increase from the long travel setting to the short travel setting. In this embodiment, the second positive spring 56 has zero preload in the short travel setting. Since the first positive spring 54 has been essentially negated or removed from the spring assembly 20 in the short travel setting, the spring rate $K_t$ for the spring assembly 20 in the short travel setting equals the second positive spring, $K_2$.

To adjust the travel from a short travel setting to a long travel setting, the rider rotates the knob 82 to the long travel setting causing the shaft 84 to displace toward the knob 82 which in turn unloads the preloaded spring 92. The poker 94 does not return on its own to the long travel setting due to the transverse forces on the metal balls 108 created by the compressed first positive spring 54. The rider must compress the entire fork until the forces between the first and second positive springs 54, 56 are substantially equal to zero. When the net force between the first and second positive springs 54, 56 across the sleeve 106 is substantially zero, the radially outward force on the metal balls 108 is near zero which allows the poker 94 to slide up and out of the way. The return spring 98 returns the poker 94 to its long travel setting (see FIG. 6). The metal balls 108 are free to move radially inwardly towards the center of the tube 86 without obstruction, but with a net zero force on the sleeve 106, the metal balls 108 do not return to the long travel setting by themselves. There are several ways to return the metal balls 108 to the long travel setting. In this embodiment, the force of the magnet 96 biases the metal balls 108 radially inwardly toward the tube 86. Once the metal balls 108 are back in the tube 86, the sleeve 106 displaces back to the long travel setting. Alternatively, a sloped poker may be used to return the metal balls 108 radially inwardly toward the tube 86.

Figure 7:
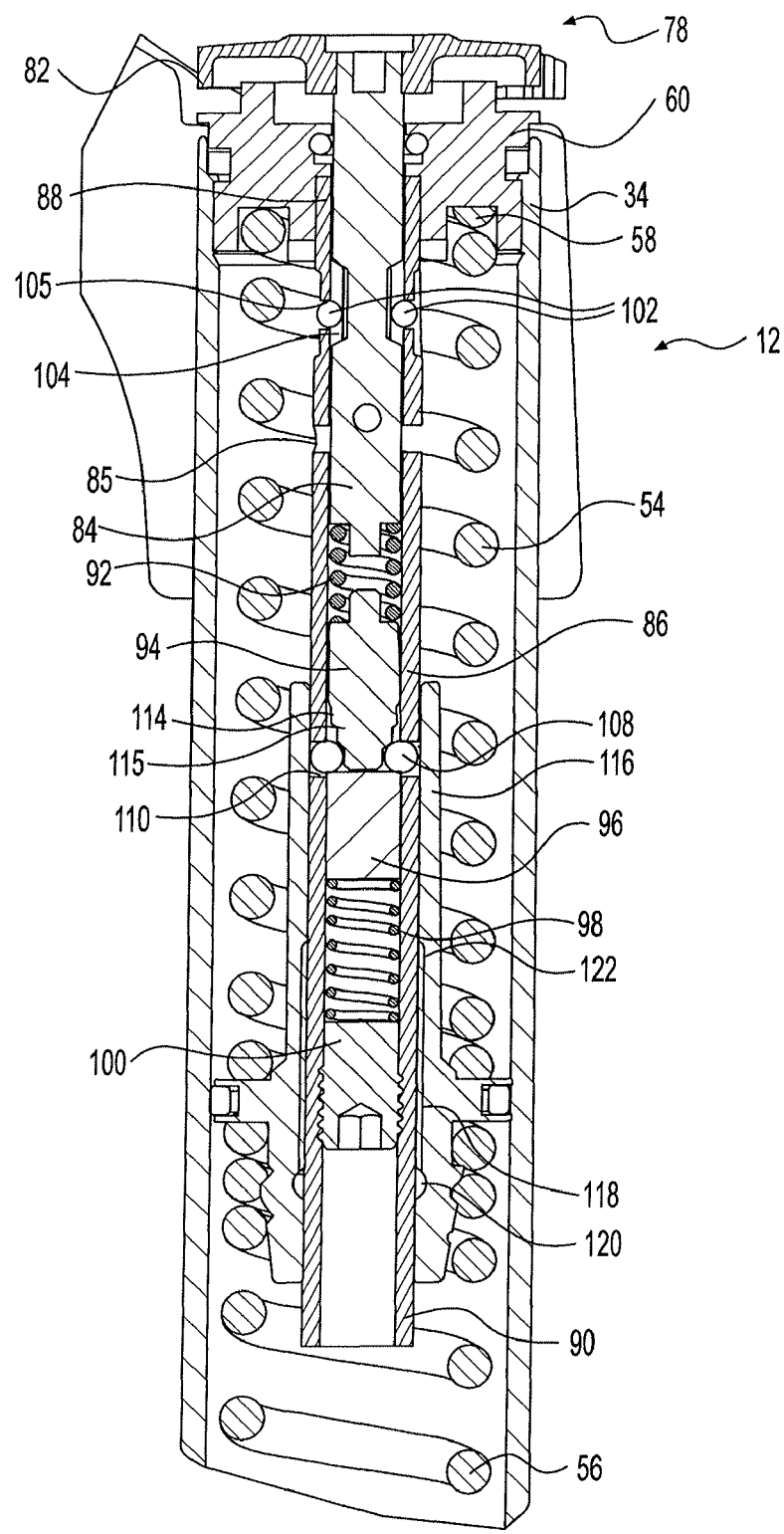
FIG. 7 is a partial front cross-sectional view of the travel adjustment mechanism including a displaceable sleeve according to another embodiment of the present invention in the long travel setting.
Figure 8:
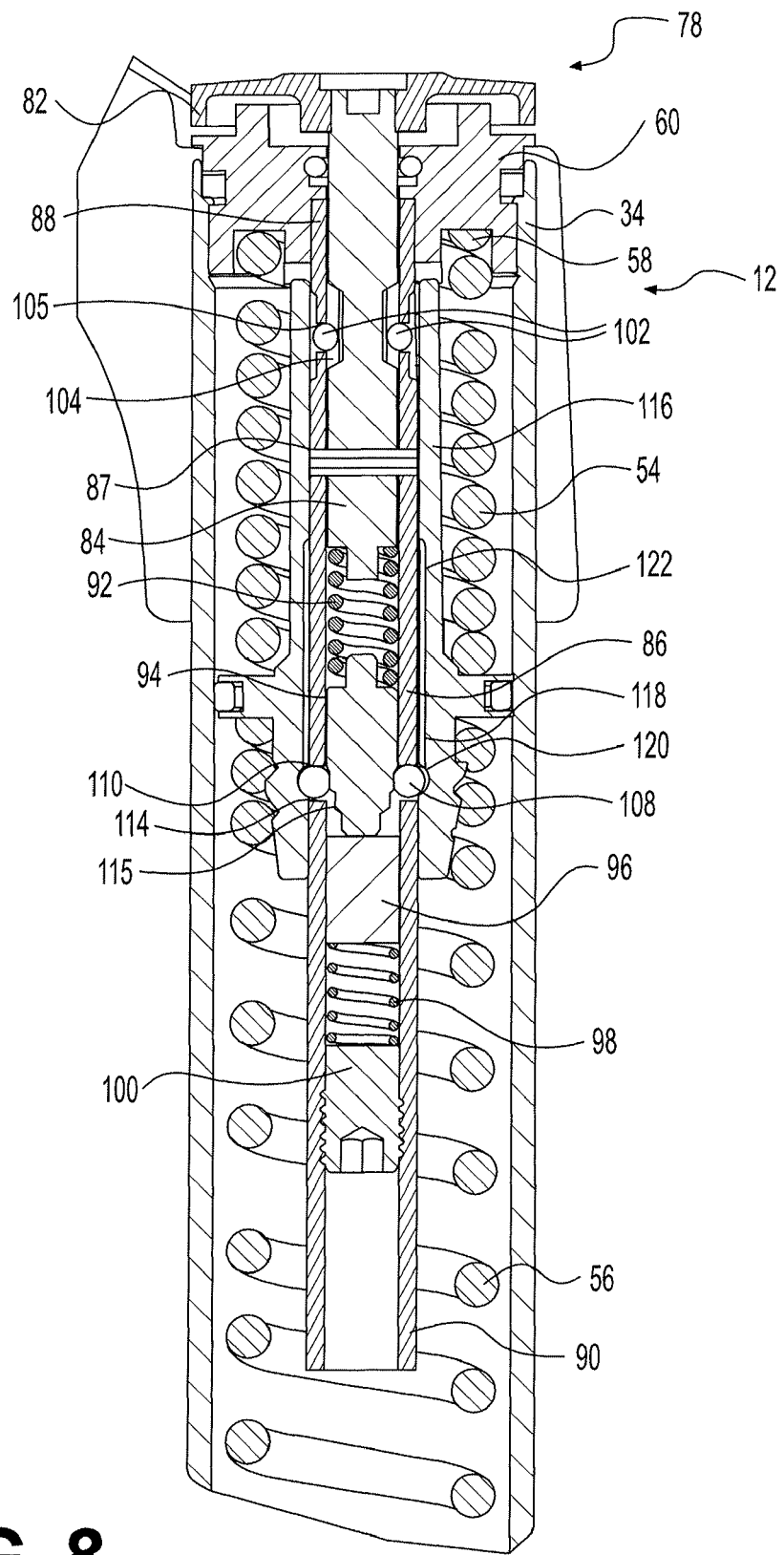
FIG. 8 is a front cross-sectional view of FIG. 7 showing the travel adjustment mechanism in a short travel setting.
Figure 9:
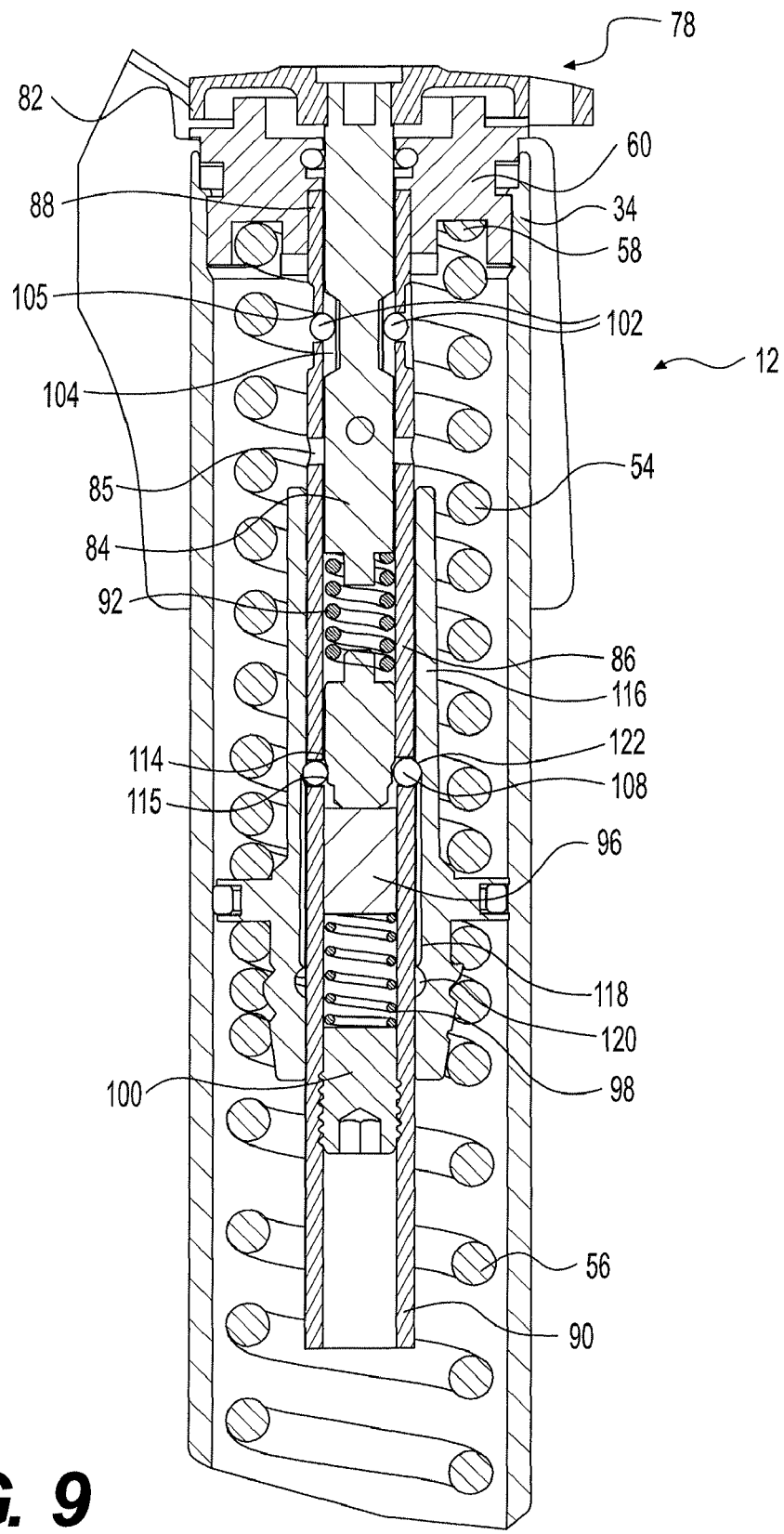
FIG. 9 is a front cross-sectional view of FIG. 7 showing the travel adjustment mechanism in a mid travel setting.
Figure 10:
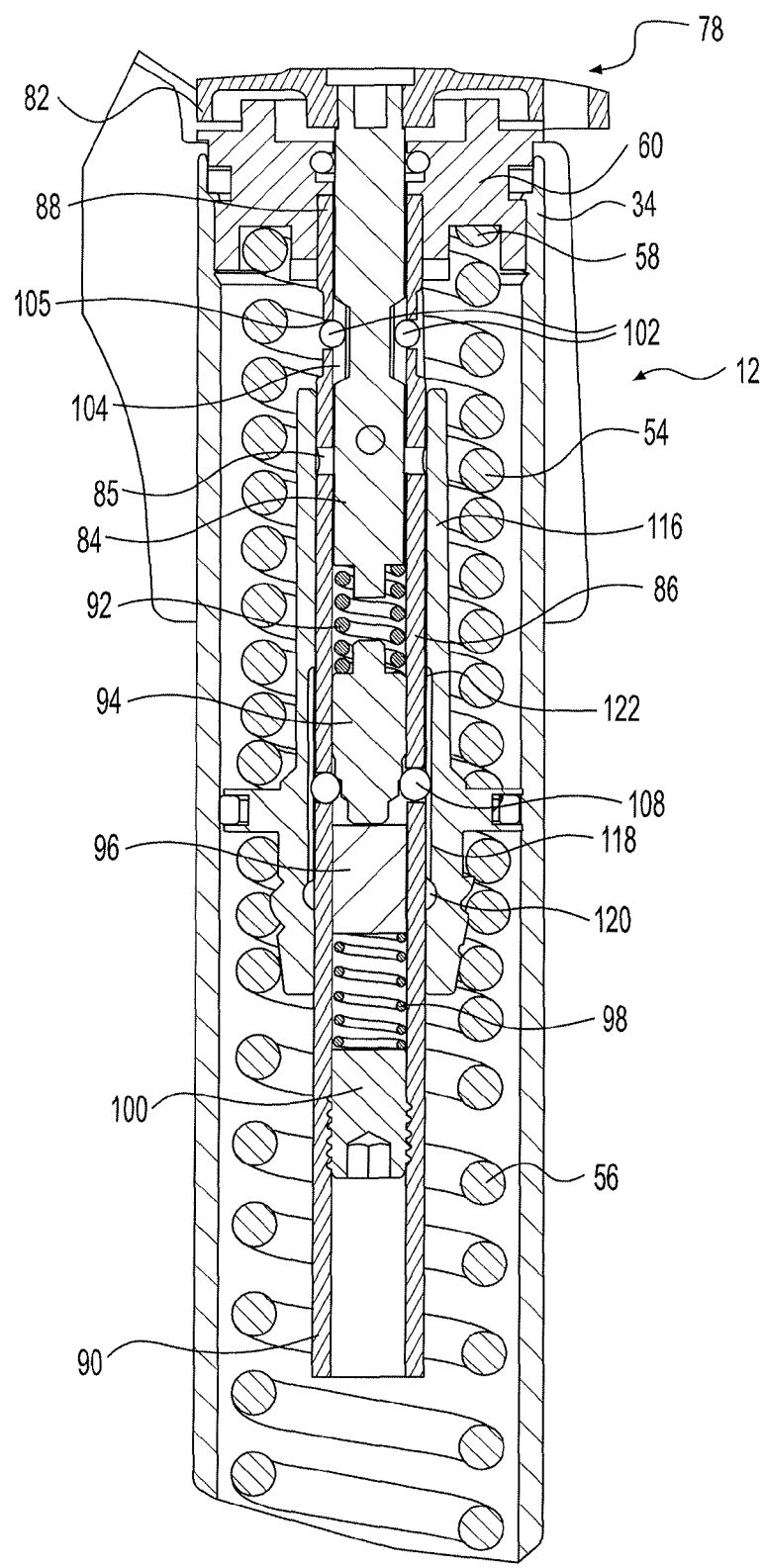
FIG. 10 is a front cross-sectional view of FIG. 7 showing the travel adjustment mechanism in a mid travel setting partially compressed under load.

FIGS. 7-10 shows another embodiment of the present invention similar to FIGS. 1-6 except that the sleeve 106 has been replaced with a sleeve 116 that includes an axially-extending counterbore 118 adjacent to a groove 120 and an additional chamfer 115 to provide three travel settings, long, mid and short travel settings. Alternatively, the travel adjustment mechanism 12 may have more than three travel settings. FIGS. 7 and 8 show the travel adjustment mechanism 12 in the long and short travel settings, respectively. In the mid travel setting, the metal balls 108 are located at an end 122 of the counterbore 118 opposite the groove 120 and are adjacent the chamfer 115 (see FIG. 9). The sleeve 116 is locked to the tube 86 in the extension (outward) direction so that the first positive spring 54 is held in a partially compressed state rather than near a maximum compressed state as in the short travel setting. Although, the sleeve 116 may not move in the extension direction, the sleeve 116 may still move in the compression direction between the end 122 of the counterbore 118 and the groove 120 when the force of the second positive spring 56 is equal to the compressed force of the first positive spring 54 (see FIG. 10). This allows the system to still use the remainder of the available spring travel held in the first positive spring 54. In the mid travel setting, the spring rate at the beginning and end of the fork stroke is that of the second positive spring 56 only and the spring rate of the middle portion of the stroke is that of the first and second positive spring 54, 56 combined in series.

Alternatively, the second positive spring 56 may be held in compression to shorten the travel and/or length of the fork rather than the first positive spring 54. Also, the first and second positive springs 54, 56 may be replaced with a single spring wherein a portion of the single spring may be held in a compressed state to shorten the travel of the fork.

Figure 11:
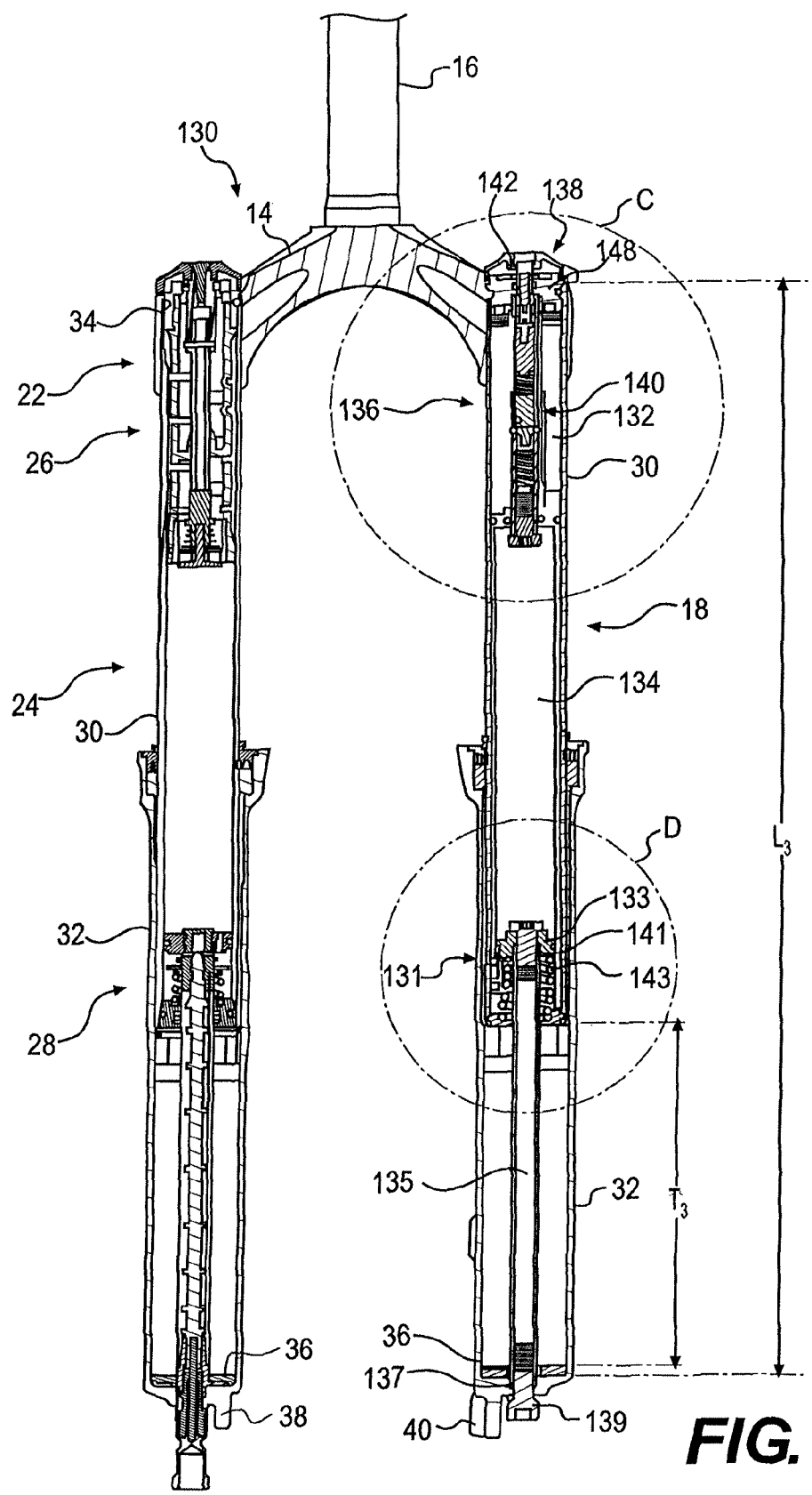
FIG. 11 is a front cross-sectional view of a suspension system in a long travel setting accordingly to another embodiment of the present invention.
Figure 12:
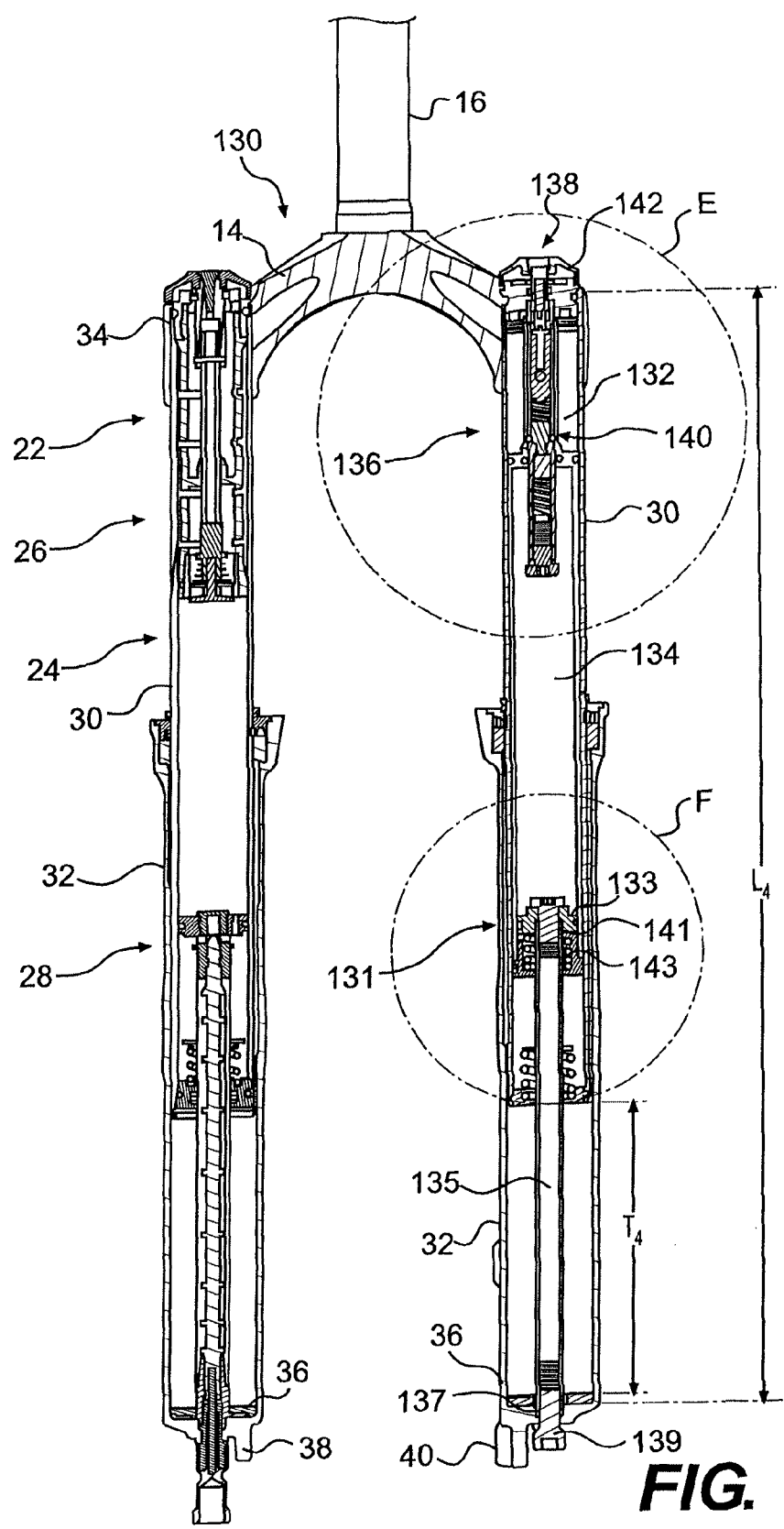
FIG. 12 is a front cross-sectional view of the suspension system of FIG. 11 in a short travel setting.
Figure 13:
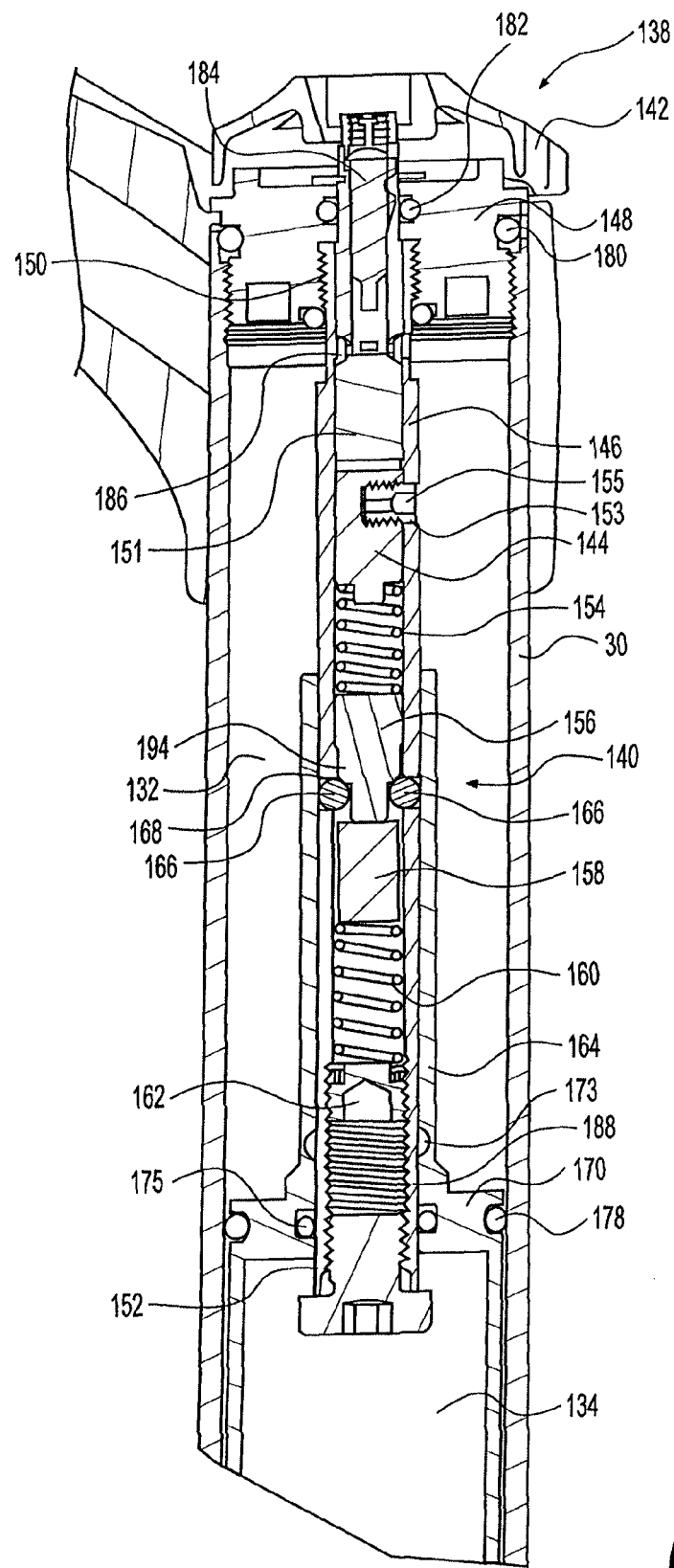
FIG. 13 is an enlarged front cross-sectional view of detail C of FIG. 11 showing a travel adjustment mechanism in the long travel setting.
Figure 14:
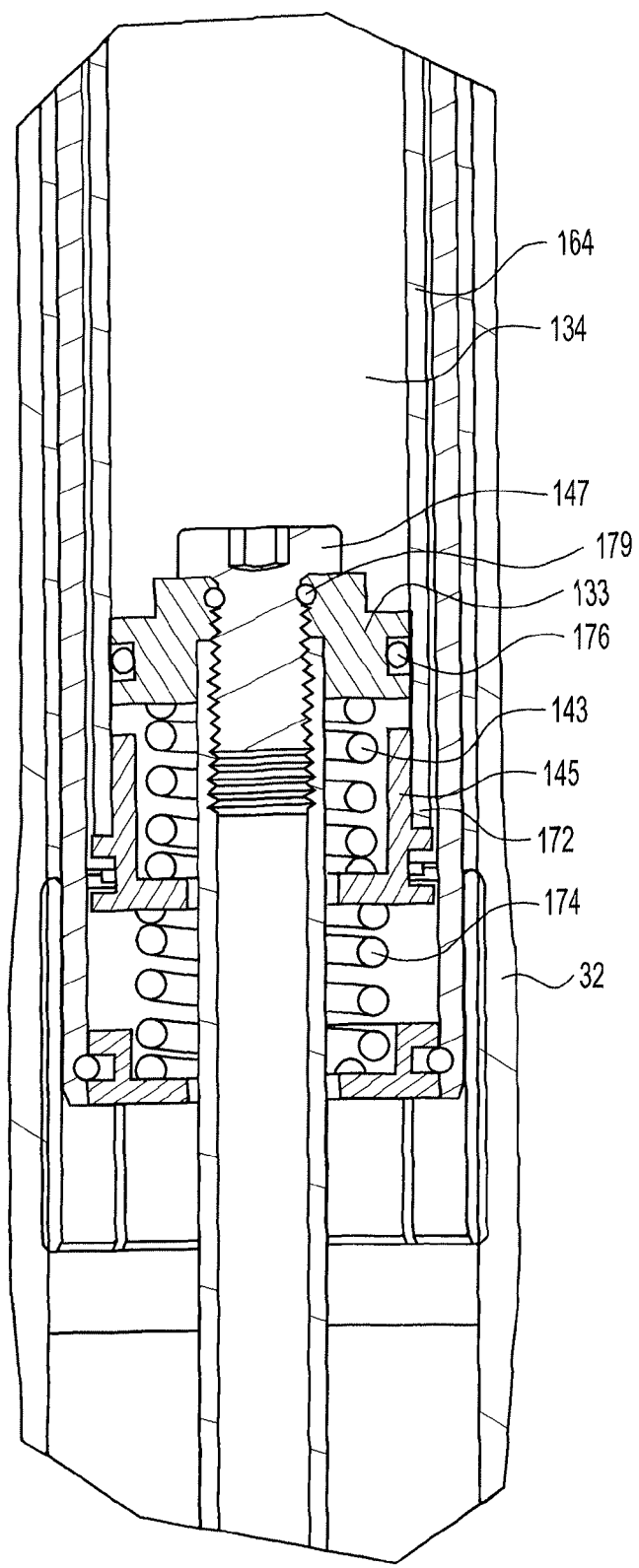
FIG. 14 is an enlarged front cross-sectional view of detail D of FIG. 11.
Figure 15:
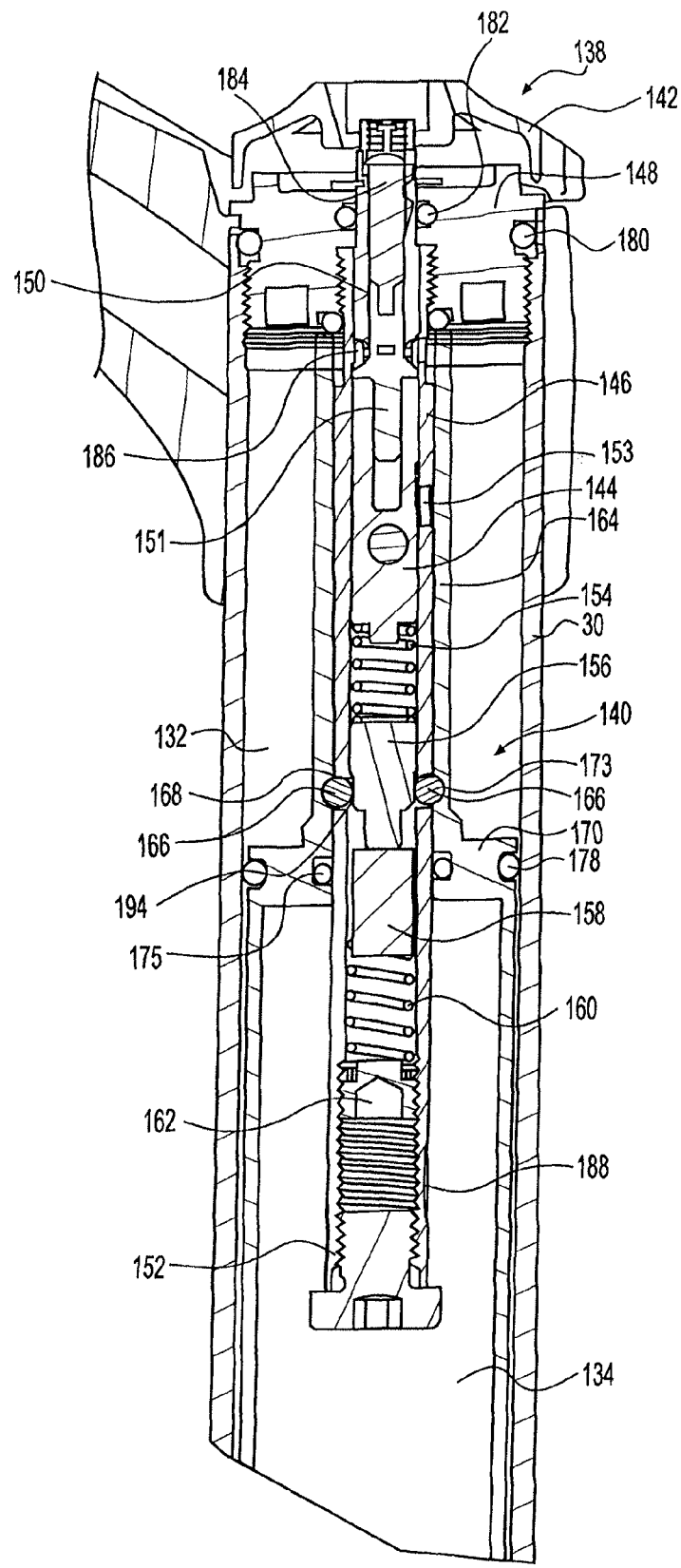
FIG. 15 is an enlarged front cross-sectional view of detail E of FIG. 12 showing the travel adjustment mechanism in the short travel setting.
Figure 16:
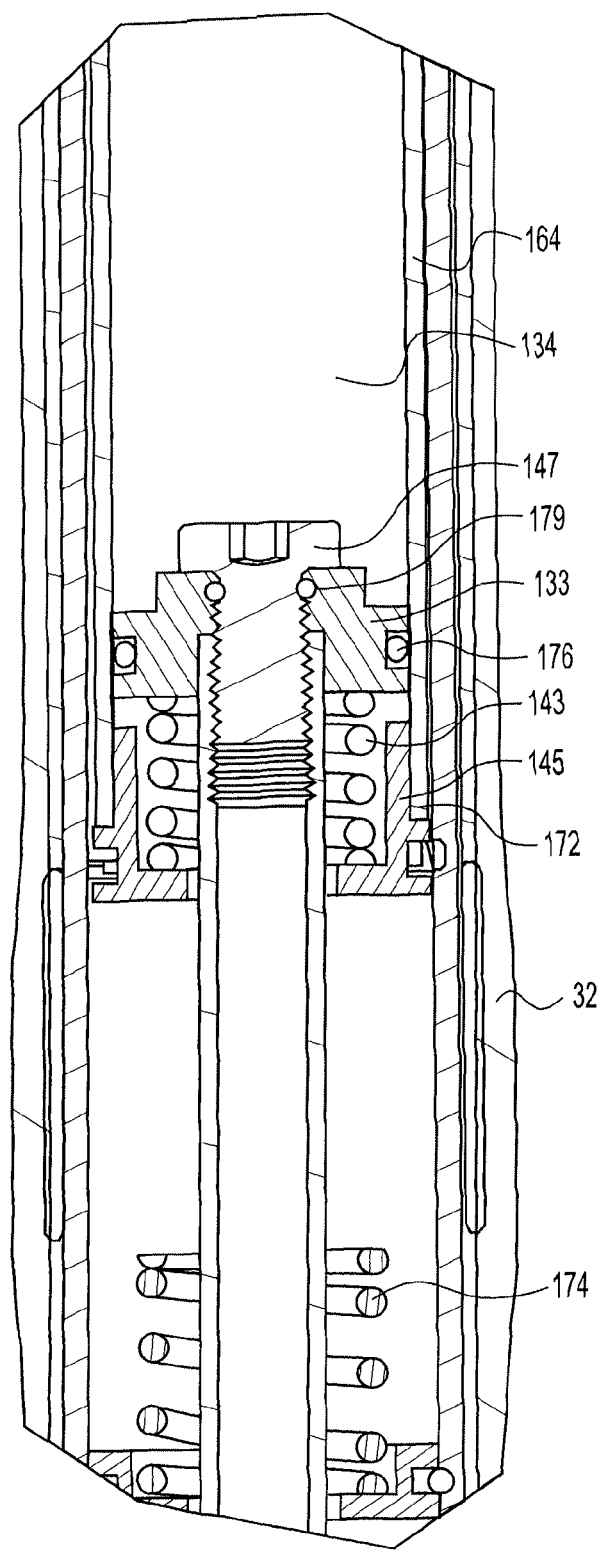
FIG. 16 is an enlarged front cross-sectional view of detail F of FIG. 12.

Looking to FIGS. 11-16, a suspension system 130 is shown according to another embodiment of the present invention similar to the previous embodiments except that the first and second positive coil springs 54, 56 have been replaced with first and second gas springs 132, 134. FIG. 11 shows the suspension system 130 in a long travel setting having a length $L_3$ and a travel $T_3$ and FIG. 12 shows the suspension system 130 in a short travel setting having a shorter length $L_4$ and a shorter travel $T_4$. The suspension system 130 includes a piston assembly 131 having a piston 133 and a rod 135. One end 137 of the rod 135 is attached to the end 36 of the lower tube 32 by a screw 139. The other end 141 of the rod 135 extends into the upper tube 30 and is attached to the piston 133 by a screw 147. One end of a negative spring or top-out spring 143 is engaged with the underside of the piston 133. The other end of the spring 143 is attached to a spring retainer 145. The spring 143 biases the upper and lower tubes 30, 32 toward each other.

A travel adjustment mechanism 136 includes an actuator 138 and a locking mechanism 140. The actuator 138 includes an external knob 142 connected to a coupler 151 connected to shaft 144, both extending through a connector, in this embodiment a tube 146, and a top cap 148 threaded to the upper tube 30. One end 150 of the tube 146 is threadably connected to the top cap 148 and the other end 152 of the tube 146 extends through the first and second positive gas springs 132, 134. The tube 146 includes a helical slot 153 for receiving a set screw 155 fixed to the shaft 144. The shaft 144 is connected to a spring 154 which is attached to a poker 156. The poker 156 is stacked on a magnet 158 which is stacked on a return spring 160 stacked on a screw 162 which preloads the return spring 160. The locking mechanism 140 includes a displaceable sleeve 164 and a locking element, in this embodiment, metal balls 166. The metal balls 166 are received in holes 168 in the tube 146. The displaceable sleeve 164 includes a piston 170 sealingly separating the first positive gas spring 132 from the second positive gas spring 134. The sleeve 164 includes a groove 173 to receive the metal balls 166 to lock the tube 146 and the sleeve 164 together. An end 172 of the displaceable sleeve 164 is attached to the spring retainer 145 which is attached to the negative spring 143. The piston 133 slides within the displace sleeve 164.

Figure 17:
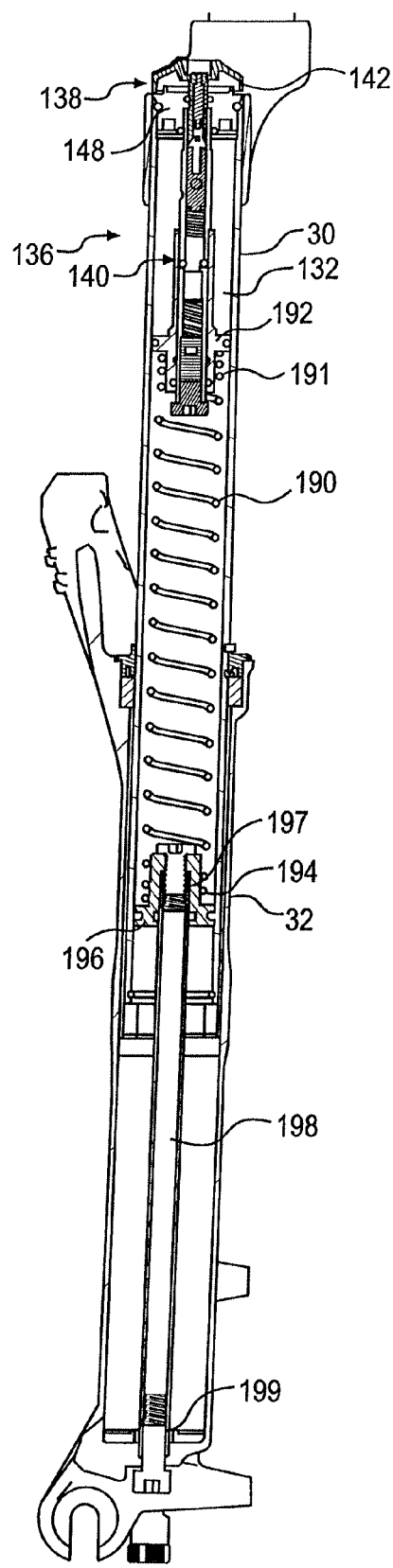
FIG. 17 is a side cross-sectional view of a leg of a suspension system according to another embodiment of the present invention.

The first positive gas spring 132 extends between the top cap 148 and the piston 170 and the second positive gas spring 134 extends between the piston 170 and the piston 133 of the piston assembly 131. The piston 133 includes O-rings 175, 178 to sealingly separate the first positive gas spring 132 and second positive gas spring 134. The piston 170 includes O-rings 176, 179 to sealingly separate the second positive gas spring 134 from the lower tube. The top cap 148 includes O-rings 180, 182 to seal the first positive gas spring 132. The first and second positive gas springs 132, 134 are filled by a Schrader valve 184 extending the coupler 151. The gas enters the first gas spring 132 through fill ports 186 in the coupler 151 and the second positive gas spring 134 is filled through a bypass dimple 188 in the tube 146. Although, the first and second positive gas springs 132, 134 are connected at top out through the bypass dimple 188, during compression, a kick spring 174 displaces the displaceable sleeve 164 to close the bypass dimple 188 with the O-ring 175 on the piston 170. Looking to FIG. 17, alternatively, the second gas spring 134 may be replaced with a coil spring 190 having one end 191 attached to a displaceable sleeve 192 similar to the displaceable sleeve 106 in FIGS. 1-6. The other end 194 of the coil spring 190 attached to a piston 196. The piston 196 is attached to one end 197 of a rod 198. The other end 199 of the rod 198 is attached to the lower tube 32.

Looking to FIGS. 13-16, to adjust the travel from a long travel setting to a short travel setting, the rider rotates the knob 142 to the short travel setting which rotates the coupler 151 and shaft 144. As the shaft 144 is rotated, the set screw 155 displaces in the helical slot 153 which drives the shaft 144 to preload or compress the spring 154 which in turn applies a force against the poker 94. The force against the poker 156 causes the poker 156 to press against the metal balls 166. The shaft 144 is prevented from returning to the long travel setting because the slot 153 is configured such that the last few degrees of rotation are flat with no pitch which causes the force generated by the spring 154 to be perpendicular to the slot 153, thus preventing the spring 154 from being able to return the shaft 144 to the long travel setting. Next, the rider pushes down, compressing the entire fork 130, causing the piston assembly 131 to slidably displace within the sleeve 164 which increases pressure in the second positive gas spring 134. This increase in pressure displaces the sleeve 164 which compresses the first gas spring 132 until the metal balls 166 align with the groove 173. Once the metal balls 166 are aligned with the groove 173, the spring 154 downwardly displaces the poker, which in turn, displaces the metal balls 166 radially outward into the groove 173, locking the sleeve 164 and the tube 146 together. A chamfer 194 on the poker 156 biases the metal balls 166 radially outwardly. The first positive gas spring 132 is now locked in a compress state. The length of the entire suspension fork 130 is shortened by the length that the first positive gas spring 132 has been compressed when the sleeve 164 and the tube 146 are locked together. The preload of the second positive spring 134 does not increase from the long travel setting to the short travel setting.

To adjust the fork travel from a short travel setting to a long travel setting, the rider rotates the knob 142 to the long travel setting causing the shaft 144 to displace toward the knob 142 which in turn unloads the preloaded spring 154. The poker 156 does not return on its own to the long travel setting do to the transverse forces on the metal balls 166 created by the compressed first positive spring 132. The rider must compress the entire fork until the forces between the first and second positive springs 132, 134 are substantially equal to zero. When the net force between the first and second positive springs 132, 134 across the sleeve 164 is substantially zero, the radially outwardly force on the metal balls 166 is near zero which allows the poker 156 to slide up and out of the way. The return spring 160 returns the poker 156 to its long travel setting. The metal balls 166 are free to move radially inwardly towards the center of the tube 146 without obstruction, but with a net zero force on the sleeve 164, the metal balls 166 do not return to the long travel setting by themselves. There are several ways to make the metal balls 166 return to the long travel setting. In this embodiment, the force of the magnet 158 pulls or biases the metal balls 166 radially inwardly toward the tube 146. Once the metal balls 166 are back in the tube 146, the sleeve 164 displaces back to the long travel setting. Alternatively, a sloped poker may be used to return the metal balls 166 to the tube 146.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A suspension system for a handlebar-steered vehicle comprising:
   an upper tube;
   a lower tube reciprocally slidable relative to the upper tube;
   a positive spring assembly biasing the upper and lower tubes away from each other;
   a piston assembly attached to the lower tube, the piston assembly deflecting the positive spring assembly under loading; and
   a travel adjustment mechanism including:
      a locking mechanism connected to the positive spring assembly and selectively maintaining a first portion of the positive spring assembly in a compressed state with the upper and lower tubes drawn toward each other; and
      an actuator operatively connected to the locking mechanism to releasably engage the locking mechanism to maintain the first portion of the positive spring assembly in the compressed state.

2. The suspension system of claim 1 wherein the positive spring assembly includes first and second positive springs in series, the locking mechanism selectively maintaining the first positive spring in the compressed state, the second positive spring attached to the piston assembly.

3. The suspension system of claim 2 wherein the locking mechanism includes a displaceable sleeve engaged and displaced with the first and second positive springs to position the displaceable sleeve into a locked position.

4. The suspension system of claim 3 wherein the locking mechanism further includes a connector attached to the upper tube and a locking element, the displaceable sleeve displaceable relative to the connector, the locking element releasably locking the displaceable sleeve and the connector to each other to maintain the first positive spring in the compressed state.

5. The suspension system of claim 4 wherein the locking element is radially biased by the actuator to engage a groove in one of the connector and the displaceable sleeve to lock the connector and the displaceable sleeve to each other with the upper and lower tubes drawn toward each other.

6. The suspension system of claim 5 wherein the actuator includes a magnet radially biasing the locking element to disengage the groove in one of the connector and the displaceable sleeve to unlock the connector and the displaceable sleeve from each other allowing the upper and lower tube to draw away from each other.

7. The suspension system of claim 6 wherein the first positive spring is one of a coil spring and a gas spring and the second positive spring is one of a coil spring and a gas spring.

8. The suspension system of claim 7 further including a negative spring biasing the upper and lower tubes toward each other.

9. The suspension system of claim 2 wherein the first positive spring is one of a coil spring and a gas spring and the second positive spring is one of a coil spring and a gas spring.

10. The suspension system of claim 1 wherein the positive spring assembly includes only a single positive coil spring, the locking mechanism selectively maintaining a first portion of the single positive coil spring in the compressed state with the upper and lower tubes drawn toward each other, an end of the single positive coil spring attached to the piston assembly.

11. The suspension system of claim 10 wherein the locking mechanism includes a displaceable sleeve engaged and displaced with the single positive coil spring to position the displaceable sleeve into a locked position.

12. The suspension system of claim 11 wherein the locking mechanism further includes a connector attached to the upper tube and a locking element, the displaceable sleeve displaceable relative to the connector, the locking element releasably locking the displaceable sleeve and the connector to each other to maintain the first portion of the single positive coil spring in the compressed state.

13. The suspension system of claim 12 wherein the locking element is radially biased by the actuator to engage a groove in one of connector and the displaceable sleeve to lock the connector and the displaceable sleeve to each other with the upper and lower tubes drawn toward each other.

14. The suspension system of claim 13 wherein the actuator includes a magnet radially biasing the locking element to disengage the groove in one of the connector and the displaceable sleeve to unlock the connector and the displaceable sleeve from each other allowing the upper and lower tubes to draw away from each other.

15. The suspension system of claim 14 further including a negative spring biasing the upper and lower tubes toward each other.

16. The suspension system of claim 1 wherein the travel adjustment mechanism selectively adjusts the suspension system between at least a first travel setting and a second travel setting; in the first travel setting, the positive spring assembly has a first preload; and in the second travel setting, the first portion of the positive spring assembly maintained in the compressed state has a second preload without increasing the preload in a second portion of the positive spring assembly.

17. A suspension system for a handlebar-steered vehicle comprising:
  an upper tube;
  a lower tube reciprocally slidable relative to the upper tube;
  positive spring means for biasing the upper and lower tubes away from each other;
  a piston assembly attached to the lower tube, the piston assembly deflecting the positive spring means under loading; and
  travel adjustment means including:
    locking means connected to the positive spring assembly and selectively maintaining a first portion of the positive spring means in a compressed state with the upper and lower tubes drawn toward each other; and
    an actuator means operatively connected to the locking means to releasably engage the locking means to maintain the first portion of the positive spring means in the compressed state.

18. The suspension system of claim 17 wherein the positive spring means includes first and second positive springs in series, the locking means selectively maintaining the first positive spring in the compressed state, the second positive spring attached to the piston assembly.

19. The suspension system of claim 18 wherein the locking means includes a displaceable sleeve engaged and displaced with the first and second positive springs to position the displaceable sleeve into a locked position.

20. The suspension system of claim 19 wherein the locking means further includes a connector attached to the upper tube and a locking element, the displaceable sleeve displaceable relative to the connector, the locking element releasably locking the displaceable sleeve and the connector to each other to maintain the first positive spring in the compressed state.

21. The suspension system of claim 20 wherein the locking element is radially biased by the actuator means to engage a groove in one of the connector and the displaceable sleeve to lock the connector and the displaceable sleeve to each other with the upper and lower tubes drawn toward each other.

22. The suspension system of claim 21 wherein the actuator means includes a magnet radially biasing the locking element to disengage the groove in one of the connector and the displaceable sleeve to unlock the connector and the displaceable sleeve from each other allowing the upper and lower tubes to draw away from each other.

* * * * *